Sept. 26, 1967 E. BOWERS 3,343,307
ROTARY WORK SUPPORT TABLE UNIT
Filed May 28, 1964 2 Sheets-Sheet 1

INVENTOR:
Eric Bowers
BY
Pierce, Schiffler & Parker
attorneys

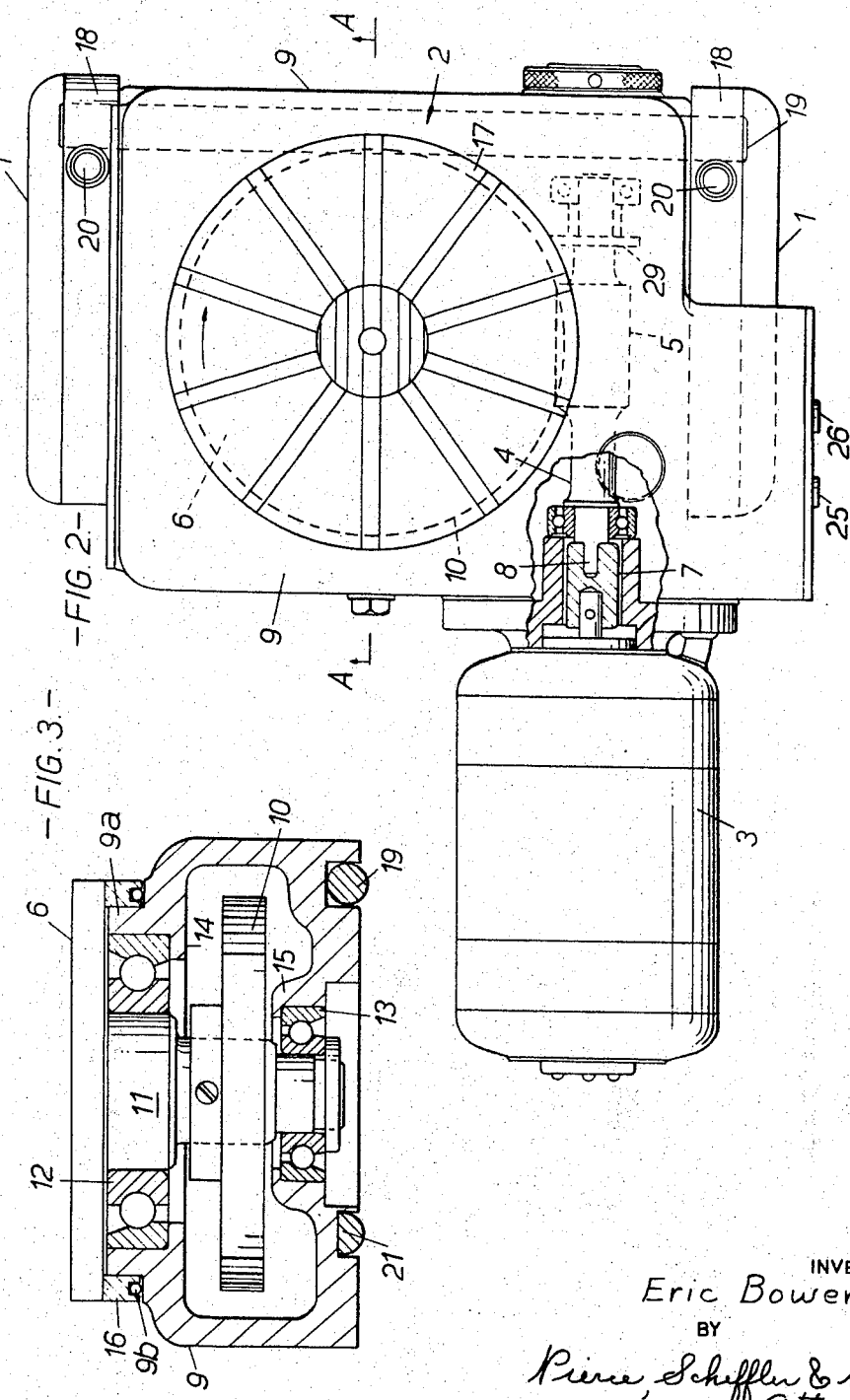

United States Patent Office 3,343,307
Patented Sept. 26, 1967

3,343,307
ROTARY WORK SUPPORT TABLE UNIT
Eric Bowers, Grange Park, Cottingley, England, assignor to T. Bowers & Co. (Toolmakers) Limited, Laisterdyke, England, a British company
Filed May 28, 1964, Ser. No. 370,977
Claims priority, application Great Britain, June 14, 1963, 23,763/63
1 Claim. (Cl. 51—237)

This invention relates to rotary work support tables for machine tools particularly for grinding machines.

Grinding machines are well known to be basically comprised of two types namely where the work-table is capable of linear and transverse movements in a horizontal plane and vertical height adjustment, and also where the work-table is designed specifically for rotary motion. It will be appreciated that there are many occasions when it would be an advantage if rotary motion could be given to a work-piece on a grinding machine which has a work-table designed for horizontal and vertical adjustment. In this manner a machine would be universal in operation and it would not be necessary to have machines specifically for rotary work.

The main object of this invention is to provide a rotary work support table unit capable of allowing rotary motion to be given to a work-piece for grinding purposes on a machine tool having a work-table designed to be given linear and transverse motion in a horizontal plane.

According to the present invention there is provided a rotary work support table unit capable of being temporarily mounted on the work-table of a machine tool, said unit including a work support rotary table, speed reduction gear means and means for driving the rotary work support table through the gear means at variable substantially low speeds. The unit may have a mounting base for the attachment of the unit to the work-table.

For clarity of description the apparatus of the present invention is referred to hereinafter as a rotary work support table unit and the table thereof is referred to as the rotary work support table whereas the table of the machine tool to which the machine of the present invention is to be attached is referred to as the work-table.

The rotary work support table may be furnished with a magnetic or other chuck or other work securing means.

The rotary work support table may have a central pendant spindle mounted in ball and/or roller or other bearings located in a housing for the driving gear means.

The invention will now be more particularly described with reference to the accompanying drawings in which:

FIG. 2 is a plan view of FIG. 1; and

FIG. 3 is a sectional elevation on line A—A of FIG. 2.

Figure 1:
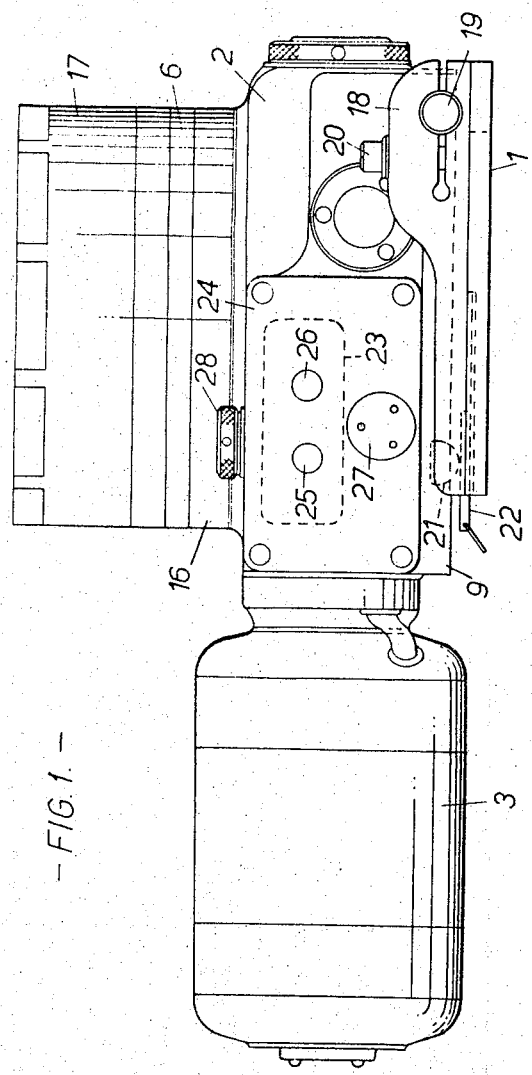
FIG. 1 is a front view of a rotary work support table unit.

In the illustrated embodiment of this invention the rotary work support table unit includes a mounting base plate 1 which can be located on the usual work-table of a grinding machine and secured by bolts or other means, preferably in an easy manner. Mounted on this base plate is a worm reduction gear unit 2 to which electric motor 3 (it may be an air operated motor) is secured. This motor is of the variable speed type and is arranged to drive the worm shaft 4, having a worm 5, of the reduction gear which is combined with the motor to form a variable substantially slow drive for the rotary work support table 6. For ease of mounting the motor has a coupling 7 provided with an open transverse slot to receive a tongue 8 on the end of the worm shaft 4. The reduction gear is contained in a housing 9 and the worm meshes with a worm wheel 10 mounted horizontally on the vertical spindle 11 of the rotary work support table 6 which forms part of the unit. This spindle 11 is located in ball bearings 12, 13 which are provided in the aforesaid housing. As shown, the spindle 11 is of two different diameters above and below the worm wheel 10 with the main ball bearing 12 located on the larger diameter and resting on a boss 14 formed within the housing, and butting against the underside of the rotary work support table 6. The other ball bearing 13 is located on the lower smaller diameter part of the spindle 11 and this is mounted in the boss 15 of the housing with a dust cap secured to a stationary boss on the housing. The arrangement is preferably such that dust will not easily penetrate to the bearing, which may be roller bearings instead of ball, or a combination of ball and roller bearings, or plain or other bearings. For example, the rotary work support table has a pendant skirt 16 around its periphery and said skirt is a close rotatable fit with the top cylindrical part 9a of the housing 9. The skirt is furnished with sealing means 9b which bears lightly upon the upper face of the housing. The arrangement is such that any dust would have to pass such sealing means, which is shown in the form of an O ring freely mounted in a recess formed in the underside of the skirt, to enter the housing. By having a skirt and stepped structural formation of the housing top, as well as the sealing ring, this combination resists the penetration of dust to the interior of the housing where the reduction driving gears are arranged.

The aforesaid rotary work support table 6 is furnished with a magnetic or other chuck 17 for securing a workpiece in position, or some other securing means may be furnished.

Preferably the mounting base plate 1 is constructed so that the rotary work support table unit is capable of being set to a desired angle of inclination for grinding operations. The base plate has two upstanding split lugs 18 to receive the ends of a fulcrum bar 19 secured to the housing. The setting screws 20 enable a neat working fit between the lugs and the bar to be obtained. For simplicity the unit is adjusted like a sine table by having a curved sine setting bar 21 normally bearing onto a removable "setting" slip plate 22 for correct zero alignment and adjusting slips of predetermined thickness could be provided to be placed, by selection, under the bar 21 instead of or in addition to slip 22. The slip 22 allows a reverse inclination to be obtained when it is removed.

The switch control means 23 for the electric motor 3 are conveniently mounted in part of the housing 9 on a removable cover plate 24 with start and stop switch buttons 25, 26. There is also a plug socket 27 for a power input cable to be plugged in from part of the machine tool or some other power source. It will be understood the housing 2 can contain oil for the reduction gears and this can be introduced through an inlet closed by the plug 28. As the oil will run towards one end of the housing when it is tilted, the worm shaft has a spinner 29 mounted thereon to circulate the oil.

In a modified arrangement, the electric motor 3 may be adapted to drive reduction worm or other gear means located in a casing on the outside of the housing 9 and although encased themselves they can be arranged to drive, through reduction or ordinary driving gear means, a shorter spindle 11. This arrangement is such that the rotary work support table 6 can be lowered further in relation to the mounting base plate 1.

Although an electric motor normally provides a simple and economical drive some other torque providing means may be used such as a flexible shaft and/or other drive from a part of the machine tool or its driving means.

What I claim is:

Rotary work support table unit, comprising a housing, bearings in said housing, a vertical spindle supported by said bearings, a rotary work support table on said spindle and above said housing, a worm wheel on said spindle, a shaft rotatably mounted in said housing, a worm on said shaft in mesh with said worm wheel, a motor connected to said shaft and located externally of said housing, a base plate for attaching the unit to a machine tool work-table, a pivotal connection between said base plate and said unit on said base plate, bearer means on said unit remote from said pivotal connection, means for adjusting said unit about said pivotal connection relative to said base plate for setting the rotary work support table at a predetermined inclination, said means for adjusting comprising a first slip plate of a predetermined thickness normally inserted between said base plate and said bearer means, and further slip plates of different thicknesses for selective use in place of said first slip plate, whereby said rotary work support table can be positioned normally in a horizontal plane and in selected upward and downward inclinations, one of said bearings being a free running main bearing located immediately under said rotary work support table between it and a fixed portion of said housing, a pendant skirt about the under edge of said rotary work support table, an upstanding annular part of said housing closely within said skirt and about said bearing, said skirt having a bottom annular facing closely above an annular facing on the housing surrounding said upstanding annular part, and sealing means retained by said skirt between its facing and that of the housing, whereby there is a stepped joint and sealing means between the work support table and housing for excluding dust from said bearing.

References Cited

UNITED STATES PATENTS

| | | | |
|---|---|---|---|
| 1,084,628 | 1/1914 | Hanson | 51—237 |
| 1,292,235 | 1/1919 | Beckett | 269—61 |
| 1,548,562 | 8/1925 | Spencer | 51—240 |
| 1,659,228 | 2/1928 | Williams | 51—237 |
| 2,422,095 | 6/1947 | Haller | 90—58.2 |
| 2,437,106 | 3/1948 | Livingstone | 51—240 |
| 2,589,489 | 3/1952 | Fuhr | 51—240 |
| 2,610,552 | 9/1952 | Victory | 90—58.2 |

HAROLD D. WHITEHEAD, *Primary Examiner.*